United States Patent
Lin et al.

(10) Patent No.: US 10,884,533 B2
(45) Date of Patent: Jan. 5, 2021

(54) TOUCH DISPLAY DEVICE

(71) Applicant: Au Optronics Corporation, Hsinchu (TW)

(72) Inventors: Tai-Hsuan Lin, Hsinchu (TW); Yu-Feng Chien, New Taipei (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/406,040

(22) Filed: May 8, 2019

(65) Prior Publication Data
US 2020/0110496 A1 Apr. 9, 2020

(30) Foreign Application Priority Data
Oct. 4, 2018 (TW) .............................. 107135116 A (51) Int. Cl.
*G06F 3/041* (2006.01)
*G09G 3/20* (2006.01)

(52) U.S. Cl.
CPC ............ *G06F 3/0412* (2013.01); *G09G 3/20* (2013.01); *G06F 3/0416* (2013.01); *G09G 2300/0413* (2013.01)

(58) Field of Classification Search
CPC .................. G06F 3/0412; G06F 3/044; G06F 2203/04102; G06F 2203/03; G06F 2203/04103; G06F 2203/04111; G06F 2203/04112; G06F 3/041; G06F 3/0416; G09G 2300/0413; G09G 3/20
See application file for complete search history.

(56) References Cited

U.S. PATENT DOCUMENTS

| | | | | |
|---|---|---|---|---|
| 9,052,766 B2 * | 6/2015 | Dunphy | ................ | G06F 3/0412 |
| 9,158,420 B2 * | 10/2015 | Cok | ...................... | G06F 3/0412 |
| 9,383,871 B2 * | 7/2016 | Adachi | ............... | G06F 3/04166 |
| 9,395,855 B2 * | 7/2016 | Nakamura | .............. | G06F 3/044 |
| 10,013,122 B2 * | 7/2018 | Kurasawa | .............. | G06F 3/044 |
| 10,338,709 B2 * | 7/2019 | Yuan | ..................... | G06F 3/0412 |
| 2012/0044202 A1 * | 2/2012 | Ishizaki | .................. | G06F 3/044 |
| | | | | 345/174 |

(Continued)

FOREIGN PATENT DOCUMENTS

| CN | 204288167 | 4/2015 |
|---|---|---|
| CN | 205068345 | 3/2016 |

(Continued)

*Primary Examiner* — Bryan Earles
(74) *Attorney, Agent, or Firm* — JCIPRNET (57) ABSTRACT

A touch display device includes a display panel and an electrode layer. The display panel includes a plurality of sub-pixels. The electrode layer is disposed on the display panel, and has a dummy electrode area and a touch electrode area. The electrode layer includes a plurality of repeated units and a plurality of connection structures. The repeated units are disposed in the dummy electrode area and the touch electrode area. Each of the repeated units overlaps with at least one sub pixel. Each of the repeated units includes a plurality of slits. The slits include a straight line slit and a bent line slit connected with the straight line slit. The connection structures are disposed in the slits of the repeated units disposed in the touch electrode area. Each of the repeated units disposed in the touch electrode area has at least one connection structure.

11 Claims, 11 Drawing Sheets

(56) References Cited

U.S. PATENT DOCUMENTS

| | | | |
|---|---|---|---|
| 2013/0222297 A1* | 8/2013 | Adachi | G06F 3/0412 |
| | | | 345/173 |
| 2014/0098057 A1* | 4/2014 | Lee | G06F 3/044 |
| | | | 345/174 |
| 2014/0184560 A1 | 7/2014 | Adachi | |
| 2015/0015498 A1* | 1/2015 | Wang | G09G 3/3648 |
| | | | 345/173 |
| 2017/0083160 A1* | 3/2017 | Hashida | G06F 3/0412 |
| 2017/0115814 A1 | 4/2017 | Adachi | |
| 2017/0277325 A1 | 9/2017 | Xie et al. | |

FOREIGN PATENT DOCUMENTS

| | | |
|---|---|---|
| CN | 107479756 | 12/2017 |
| TW | 201428577 | 7/2014 |
| TW | I622913 | 5/2018 |

\* cited by examiner

TOUCH DISPLAY DEVICE

CROSS-REFERENCE TO RELATED APPLICATION

This application claims the priority benefit of Taiwan application serial no. 107135116, filed on Oct. 4, 2018. The entirety of the above-mentioned patent application is hereby incorporated by reference herein and made a part of this specification.

BACKGROUND

Field of the Disclosure

The present disclosure relates to a touch display device, and more particularly to a touch display device having a dummy electrode area and a touch electrode area.

Description of Related Art

With the advancement of technology, touch devices are commonly available on the market, and various related technologies have emerged in an endless stream. In some personal electrical appliances (such as mobile phones, tablet computers, smart watches, etc.), touch electrodes are combined with display panel to form an electronic device having both a touch function and a display function.

However, if the touch electrodes are formed on the display panel, the transmittance of a portion of the display panel that is covered by the touch electrodes is inconsistent with the portion that is not covered by the touch electrodes, and the problems seriously affect the display quality of the device. Therefore, there is a need for a method that can solve the above problems.

SUMMARY OF THE DISCLOSURE

The disclosure provides a touch display device, which can improve the problem of ununiformed transmittance that affects display quality.

A touch display device of the present disclosure includes a display panel and an electrode layer. The display panel includes a plurality of sub-pixels. The electrode layer is located on the display panel and has a dummy electrode area and a touch electrode area. The electrode layer includes a plurality of repeated units and a plurality of connection structures. The repeated units are located in the dummy electrode area and the touch electrode area. Each of the repeated units overlaps at least one corresponding sub-pixel. Each of the repeated units includes a plurality of slits. The slit includes a straight line slit and a bent line slit connected to the straight line slit. The connection structures are located in slits of the repeated units disposed in the touch electrode area. Each of the repeated units located in the touch electrode area has at least one connection structure.

In order to make the aforementioned features and advantages of the disclosure more comprehensible, embodiments accompanying figures are described in detail below.

DESCRIPTION OF EMBODIMENTS

Figure 1A:
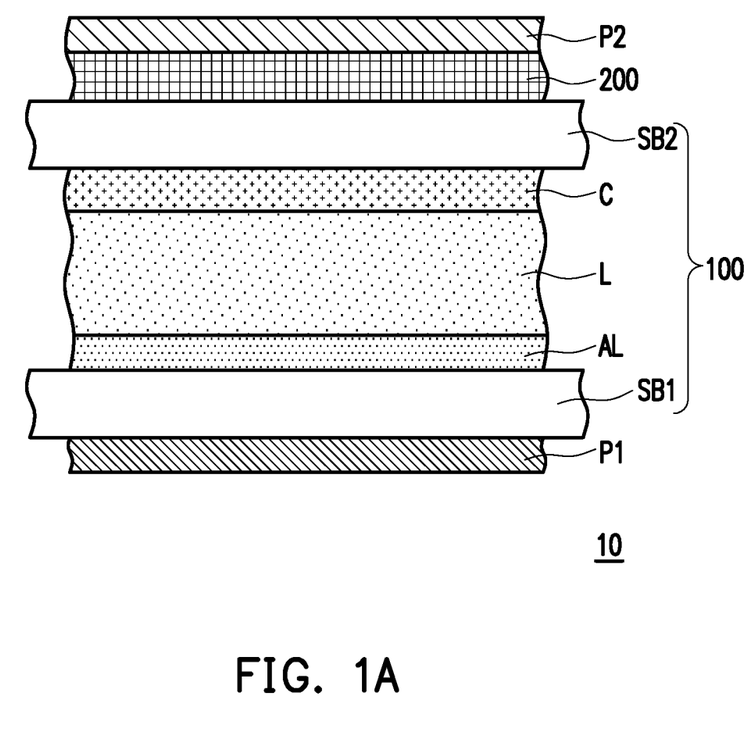
FIG. 1A is a schematic cross-sectional view of a touch display device according to an embodiment of the disclosure.
Figure 1B:
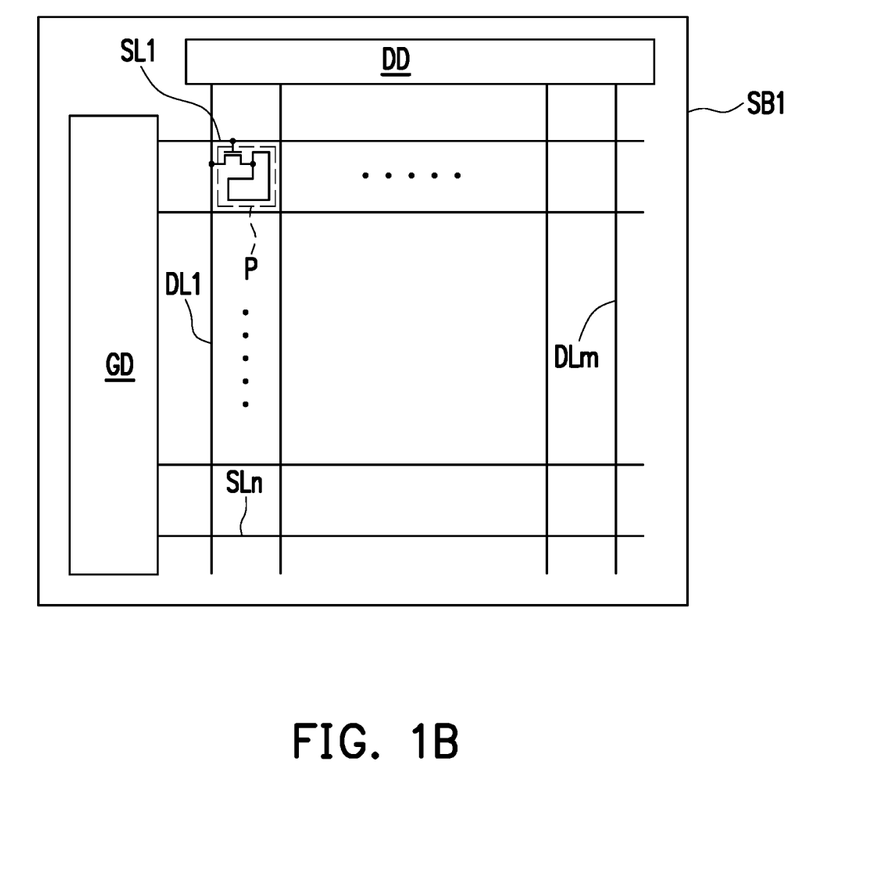
FIG. 1B is a schematic top view of a display panel according to an embodiment of the disclosure.

FIG. 1A is a schematic cross-sectional view of a touch display device according to an embodiment of the disclosure. FIG. 1B is a schematic top view of a display panel according to an embodiment of the disclosure. FIG. 1B omits some components in the display panel.

A touch display device 10 includes a display panel 100 and an electrode layer 200. In the embodiment, the touch display device 10 further includes a polarizer P1 and a polarizer P2.

The display panel 100 includes a plurality of sub-pixels P. In the present embodiment, the display panel 100 includes a first substrate SB1, a second substrate SB2, a display medium layer L, a color conversion element C, and an active device layer AL. The display medium layer L, the color conversion element C, and the active device layer AL are located between the first substrate SB1 and the second substrate SB2.

The active device layer AL is located on the first substrate SB1 and includes a plurality of scan lines SL1 to SLn, a plurality of data lines DL1 to DLm, and a plurality of sub-pixels P. The scan lines SL1 to SLn and the data lines DL1 to DLm are alternately arranged with each other. The sub-pixel P includes an active device and a pixel electrode. The active device can be a bottom-gate type thin film transistor or a top-gate type thin film transistor including a gate, a channel, a source, and a drain. The active device is electrically connected to a corresponding one of the scan lines SL1 to SLn and a corresponding one of the data lines DL1 to DLm. In addition, the active device is electrically connected to the pixel electrode.

In the embodiment, the touch display device 10 further has a driving circuit GD and a driving circuit DD located on the first substrate SB1. The driving circuit GD is electrically connected to the scan lines SL1 to SLn. The driving circuit DD is electrically connected to the data lines DL1 to DLm.

The display medium layer L is located between the first substrate SB1 and the second substrate SB2. The display medium layer L is, for example, a liquid crystal or other display medium.

The color conversion element C is located on the second substrate SB2. The color conversion element C includes, for example, a red filter pattern, a green filter pattern, and a blue filter pattern. In some embodiments, the color conversion element C may also include filter patterns of other colors. In some embodiments, a black matrix is located between filter patterns of different colors. Although the color conversion element C is located on the second substrate SB2 as an example in the present embodiment, the disclosure is not limited thereto. In other embodiments, the color conversion element C is located on the first substrate SB1 and constitutes a color filter on array (COA) structure.

The polarizer P1 and the polarizer P2 are respectively disposed on the first substrate SB1 and the second substrate SB2. The electrode layer 200 is located on the display panel 100. In the present embodiment, the electrode layer 200 is disposed between the polarizer P2 and the second substrate SB2, but the disclosure is not limited thereto. In some embodiments, the polarizer P1 and the polarizer P2 are disposed between the first substrate SB1 and the second substrate SB2. The electrode layer 200 may be a transparent or non-transparent conductive material such as a metal, a metal oxide (for example, indium tin oxide), a semiconductor, or a graphene.

In the embodiment, the display panel 100 includes a liquid crystal display panel (such as a TN display panel, an MVA display panel, an AHVA display panel, etc.), but the disclosure is not limited thereto. In other embodiments, the display panel 100 can be a micro light emitting diode display panel, an organic light emitting diode display panel, or other types of display panels.

Figure 2A:
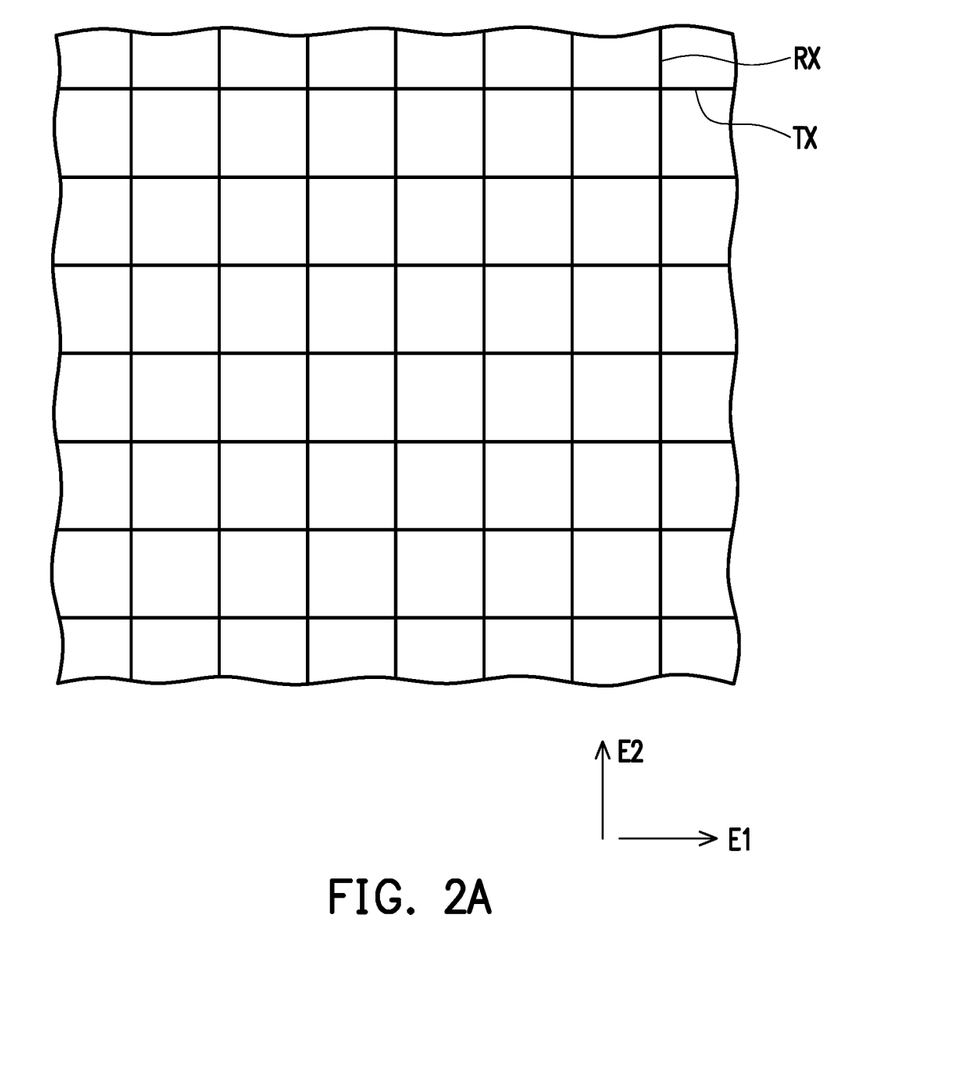
FIG. 2A is a schematic top view of an electrode layer in an embodiment of the present disclosure.
Figure 2B:
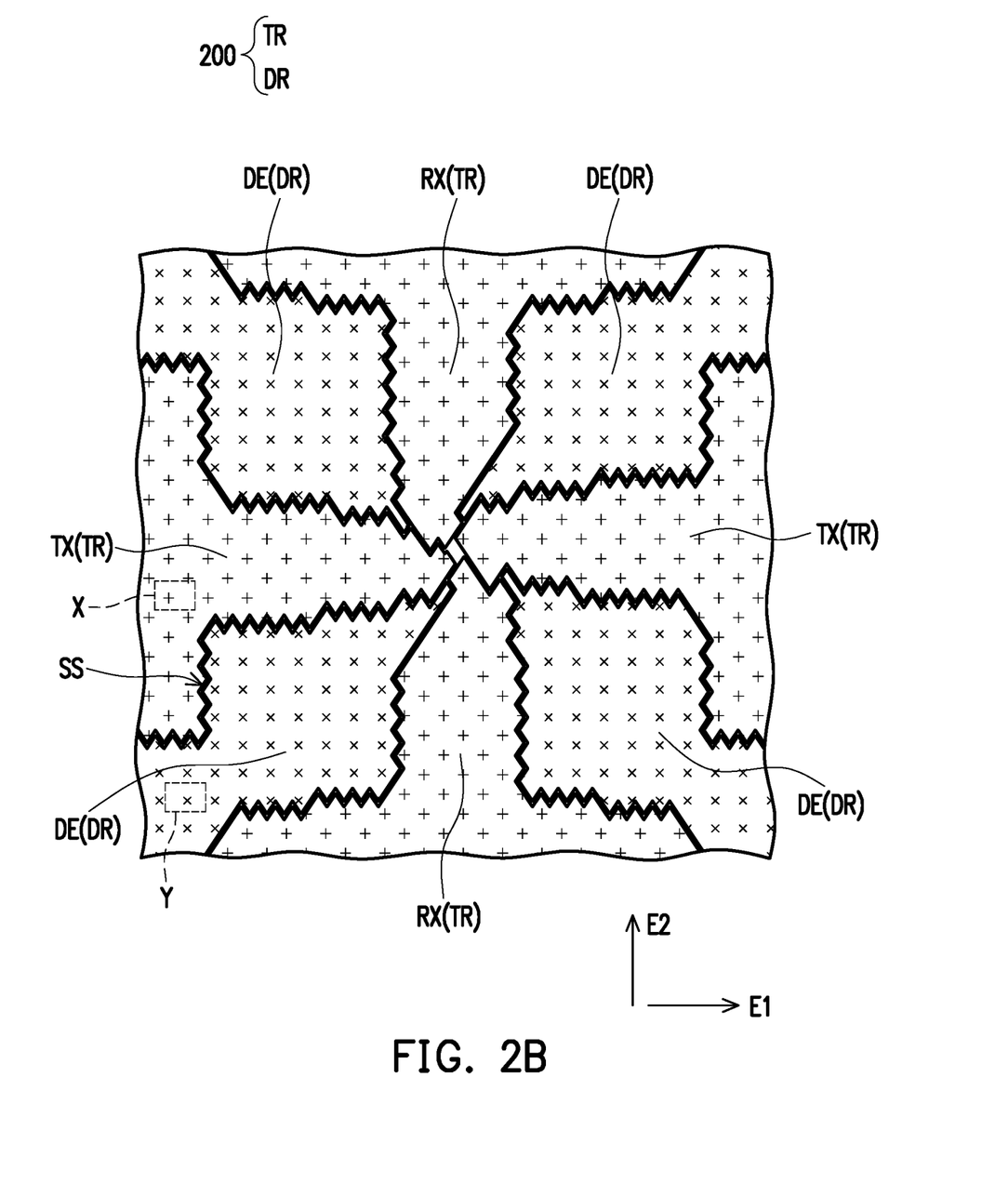
FIG. 2B is a schematic partially enlarged top view of FIG. 2A.
Figure 3A:
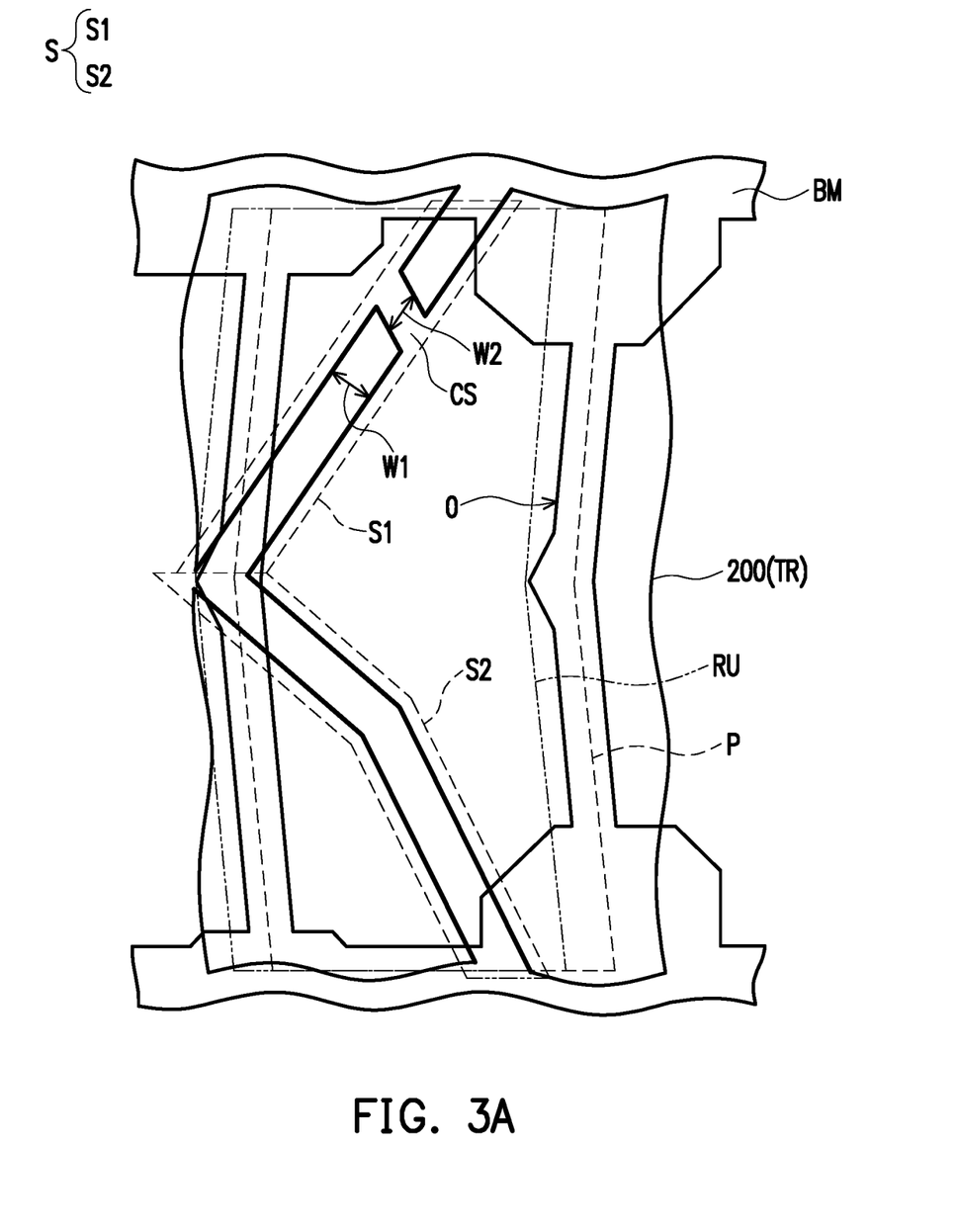
FIG. 3A is a schematic top view of an electrode layer and a black matrix in a touch electrode area.
Figure 3B:
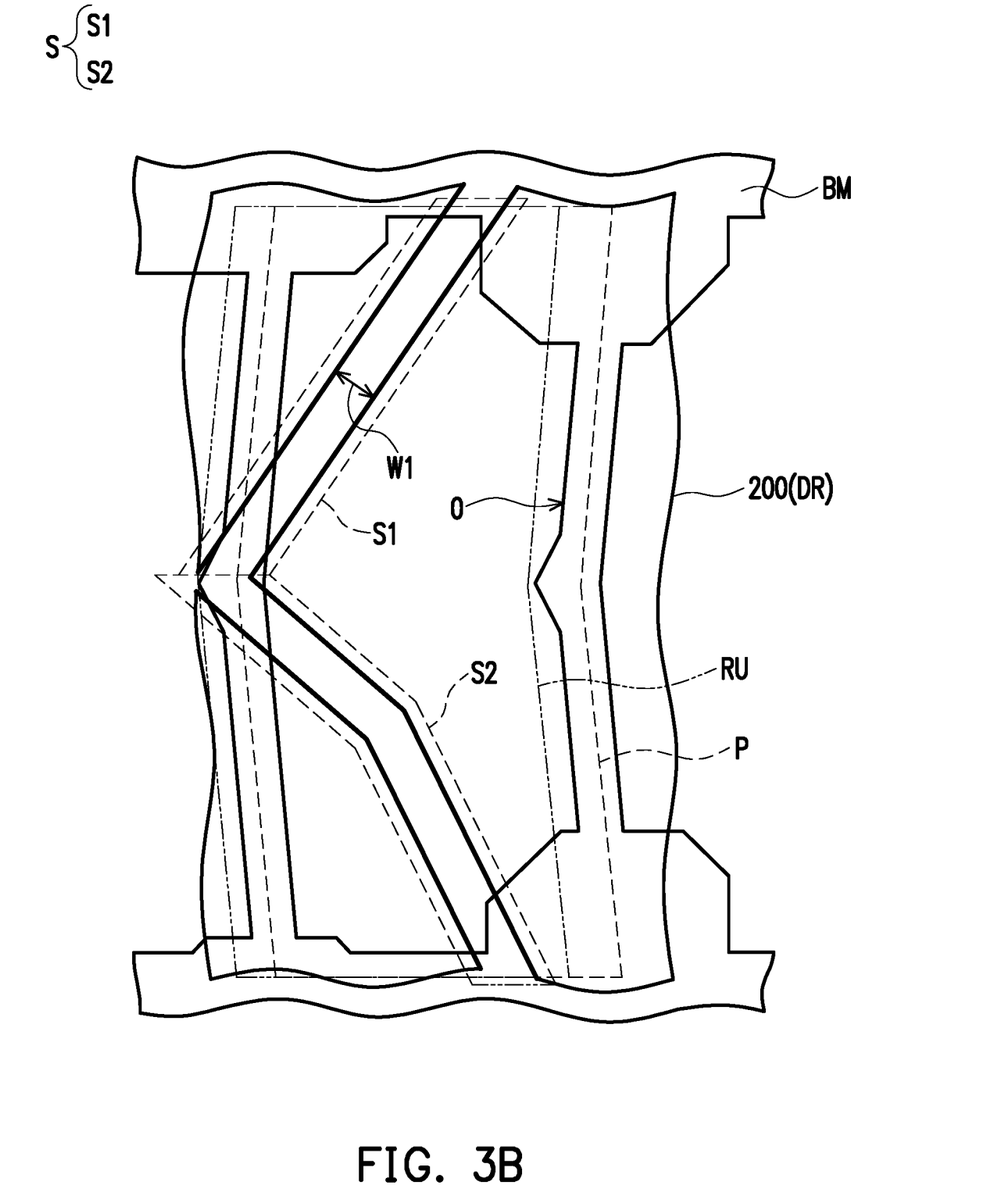
FIG. 3B is a schematic top view of an electrode layer and a black matrix in a dummy electrode area.

FIG. 2A is a schematic top view of an electrode layer in an embodiment of the present disclosure. FIG. 2B is a schematic partially enlarged top view of FIG. 2A. FIG. 2A omits the dummy electrode, and FIG. 2B omits the dummy electrode area and the slit in the touch electrode area. FIG. 3A is a schematic top view of an electrode layer and a black matrix in a touch electrode area. FIG. 3B is a schematic top view of an electrode layer and a black matrix in a dummy electrode area. FIG. 3A corresponds to the area X in FIG. 2B, and FIG. 3B corresponds to the area Y in FIG. 2B.

Referring to FIG. 2A and FIG. 2B, an electrode layer 200 has a dummy electrode area DR and a touch electrode area TR. In this embodiment, the touch electrode area TR of the electrode layer 200 includes a driving electrode TX and a sensing electrode RX. The extending direction E1 of the driving electrode TX is staggered with the extending direction E2 of the sensing electrode RX. The driving electrode TX is separated from the sensing electrode RX. In the present embodiment, the driving electrodes TX in the extending direction E1 are connected together through a bridging element (not shown), and the sensing electrodes RX in the extending direction E2 are connected together through another bridging element (not shown). There may be an insulating layer between the different bridging elements. In the present embodiment, the electrode layer 200 includes four T-shaped structures adjacent to the position where the driving electrode TX and the sensing electrode RX are staggered with each other, but the disclosure is not limited thereto. The driving electrode TX and the sensing electrode RX may also include other geometrical shapes. It should be noted that the area X is exemplified by a portion of the touch electrode area TR corresponding to the driving electrode TX and the black matrix. However, a portion of the touch electrode area TR corresponding to the sensing electrode RX and the black matrix is also a similar or an identical structure.

The dummy electrode area DR of the electrode layer 200 includes a dummy electrode DE, and the dummy electrode DE is separated from the driving electrode TX and the sensing electrode RX. The dummy electrode DE, the driving electrode TX, and the sensing electrode RX include, for example, the same conductive material. In the embodiment, the dummy electrode DE is a floating electrode.

Referring to FIG. 2B, FIG. 3A and FIG. 3B, the electrode layer 200 includes a plurality of repeated units RU and a plurality of connection structures CS. The repeated units RU are located in the dummy electrode area DR and the touch electrode area TR. In other words, the dummy electrode DE, the driving electrode TX and the sensing electrode RX all include a plurality of repeated units RU. In the present embodiment, the black matrix BM has a plurality of openings O, and each of the openings O corresponds to one sub-pixel P. Each of the repeated units RU overlaps at least one corresponding sub-pixel P. In the embodiment, the vertical projection of each repeated unit RU is slightly staggered with the vertical projection of the corresponding sub-pixel P. For example, each repeated unit RU overlaps two adjacent sub-pixels P, but the disclosure is not limited thereto. In other embodiments, each repeated unit RU overlaps one sub-pixel P.

In some embodiments, the dummy electrode DE and the driving electrode TX are separated from each other through a connected slit SS, the dummy electrode DE and the sensing electrode RX are separated from each other through a connected slit SS, and the driving electrode TX and the sensing electrode RX are separated from each other through a connected slit SS. Each of the repeated units RU includes a plurality of slits S. The slit S includes a straight line slit S1 and a bent line slit S2 connected to the straight line slit S1. One end of the straight line slit S1 is connected to one end of the bent line slit S2. The straight line slit S1 and the bent line slit S2 intersect at one point. In the present embodiment, the intersection of the straight line slit S1 and the bent line slit S2 overlaps the black matrix BM, but the disclosure is not limited thereto. In some embodiments, the slit S has a width W1 of 6 microns to 10 microns. The configuration of the slit S on the dummy electrode DE allows the electrode layer 200 to have a lower capacitive load to achieve a high signal to noise ratio. In the present embodiment, the slit S includes a straight line slit S1 and a bent line slit S2 connected to the straight line slit S1, but the present disclosure is not limited thereto. In other embodiments, except for one straight line slit S1 and one bent line slit S2, the slit S of each repeated unit RU may further include other straight line slits or other bent line slits or a combination of the above. In some embodiments, the slits SS and the slits S may have the same or different shapes.

In the present embodiment, the bent line slit S2 is composed of two straight line slits having different extending directions, but the disclosure is not limited thereto. In other embodiments, the bent line slit S2 is an arc-shaped slit. In other embodiments, the bent line slit S2 is composed of three or more straight line slits having different extending directions.

Each of the repeated units RU located in the touch electrode area TR has at least one connection structure CS. The connection structure CS is located in the slit S of the repeated unit RU disposed in the touch electrode area TR. In the present embodiment, the connection structure CS is located in the straight line slit S1 of the repeated unit RU disposed in the touch electrode area TR, and divides the straight line slit S1 into two segments. In other embodiments, the connection structure CS is located in the bent line slit S2 of the repeated unit RU disposed in the touch electrode area TR, and divides the bent line slit S2 into two segments. In other embodiments, each of the repeated units RU located in the touch electrode area TR has two connection structures CS, and the two connection structures CS are respectively located in the bent line slit S2 and the straight line slit S1. In some embodiments, the width W2 of the connection structure CS ranges from 6 microns to 25 microns. In the present embodiment, the connection structures CS, the driving electrode TX, the sensing electrode RX, and the dummy electrode DE belong to the same conductive material layer. In other embodiments, the connection structures CS are formed after the formation of the driving electrode TX, the sensing electrode RX, and the dummy electrode DE, and the connection structures CS are located only in part of the bent line slits S2 and the straight line slits S1.

In this embodiment, since the dummy electrode area DR of the electrode layer 200 and the touch electrode area TR have similar slit arrangements, it can be that there is a similar slit cutting rule, and the difference only lies in that the touch electrode area TR has connection structures CS. Therefore, the difference between the effective maximum transmittance and the effective minimum transmittance on the electrode layer 200 may be less than 0.4% (for example, 0.2% to 0.4%, preferably less than 0.24%), thereby improving the ununiformed transmittance that affects display quality.

Figure 4A:
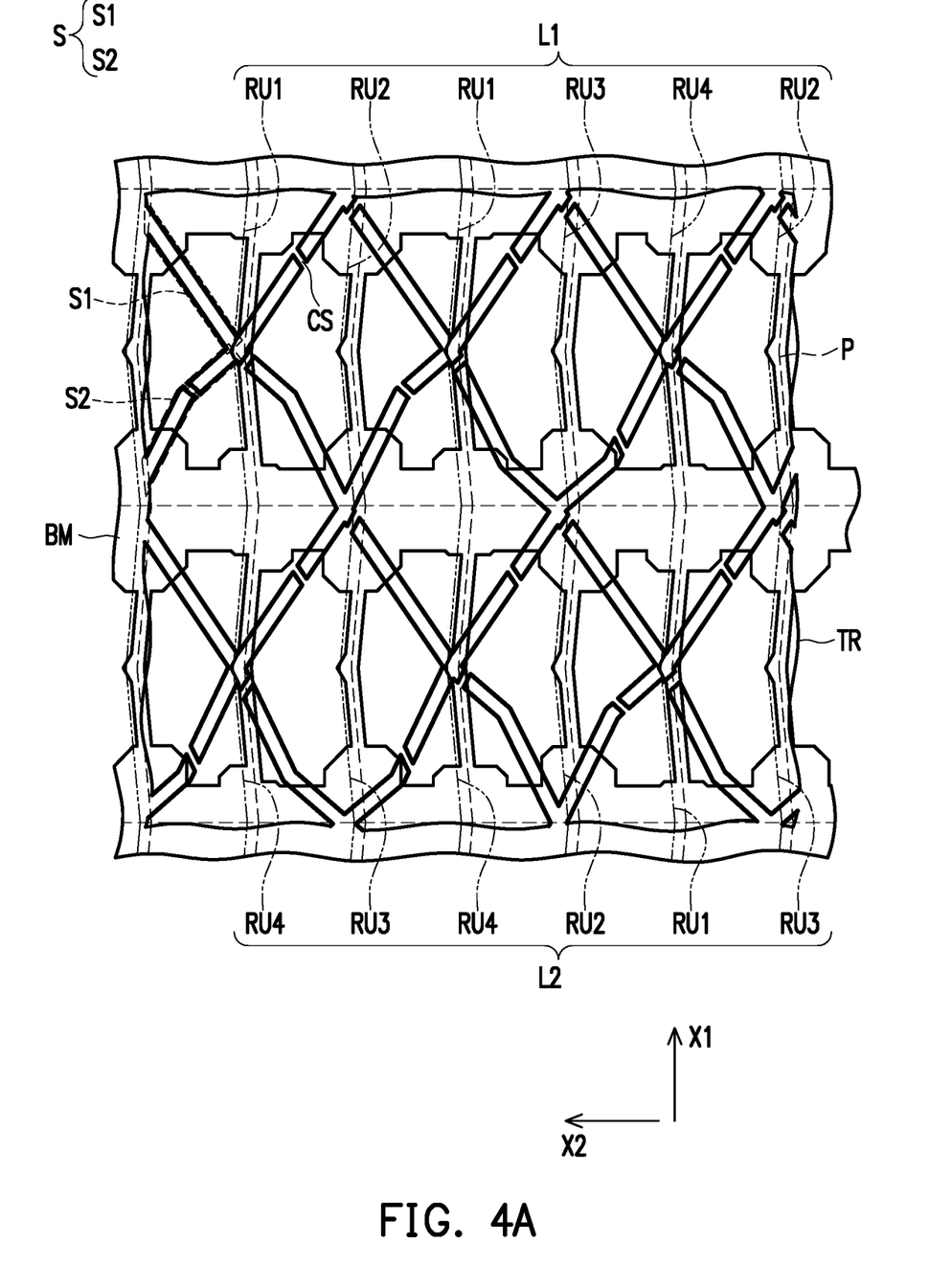
FIG. 4A is a schematic top view of an electrode layer and a black matrix in a touch electrode area.
Figure 4B:
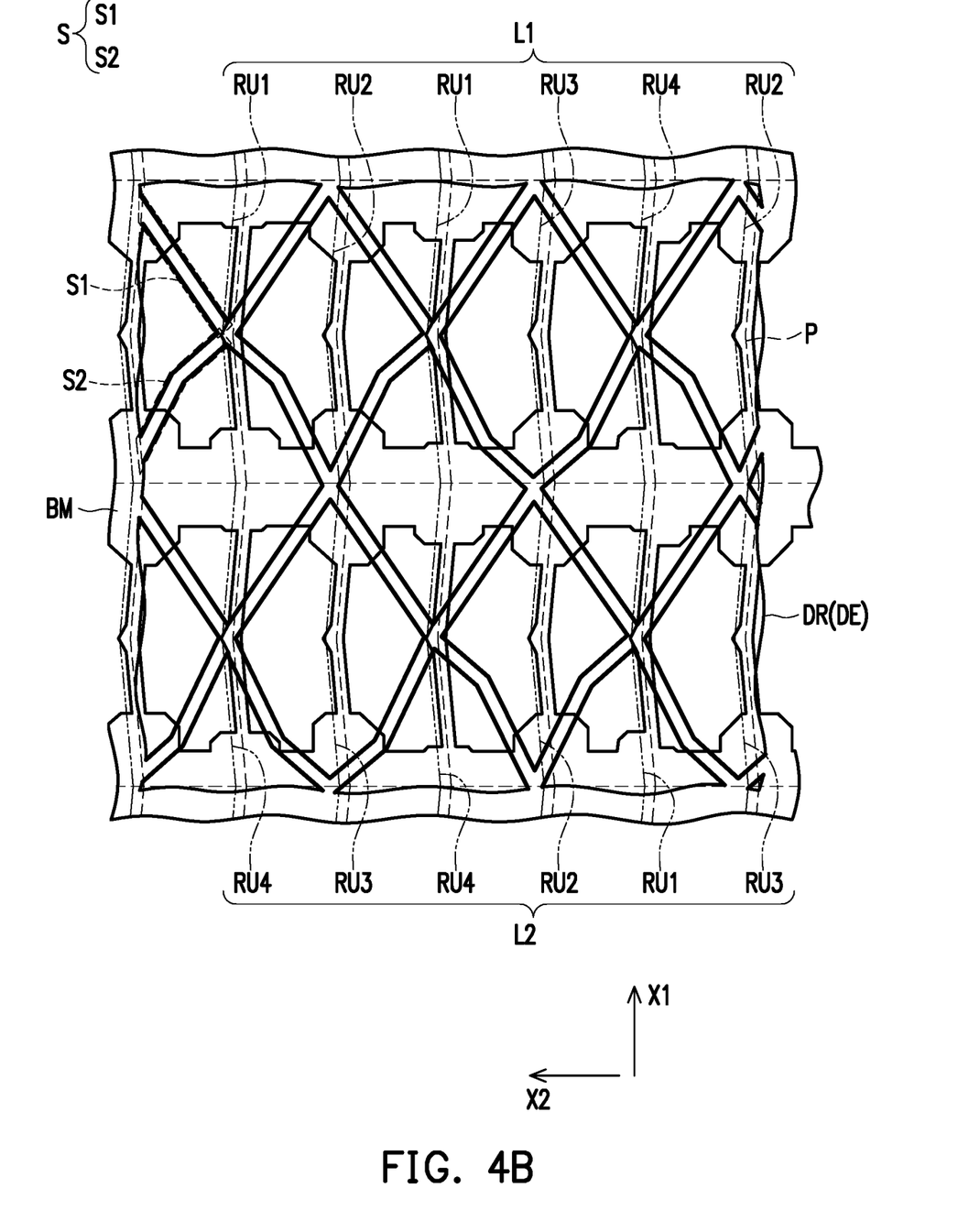
FIG. 4B is a schematic top view of an electrode layer and a black matrix in a dummy electrode area.

FIG. 4A is a schematic top view of an electrode layer and a black matrix in a touch electrode area. FIG. 4B is a schematic top view of an electrode layer and a black matrix in a dummy electrode area. It should be noted that the embodiments of FIG. 4A and FIG. 4B adopt the reference numbers and parts of the content in the embodiments of FIG. 3A and FIG. 3B, wherein the same or similar reference numerals denote the same or similar elements, and the same technical descriptions are omitted. The omitted descriptions can be derived from the foregoing embodiments and thus not repeated herein.

Referring to FIG. 4A and FIG. 4B, in the embodiment, the electrode layer 200 includes a structure consisting of three first repeated units RU1, three second repeated units RU2, three third repeated units RU3, and three fourth repeated units RU4 that are repeatedly arranged as a unit. More specifically, the dummy electrode area DR of the electrode layer 200 includes a structure consisting of three first repeated units RU1, three second repeated units RU2, three third repeated units RU3, and three fourth repeated units RU4 that are repeatedly arranged as a unit, and the touch electrode area TR also includes a structure consisting of three first repeated units RU1, three second repeated units RU2, three third repeated units RU3, and three fourth repeated units RU4 that are repeatedly arranged as a unit.

One of the first repeated units RU1, one of the second repeated units RU2, another one of the first repeated units RU1, one of the third repeated units RU3, one of the fourth repeated units RU4, and another one of the second repeated units RU2 are sequentially arranged in the first row L1.

Another fourth repeated unit RU4, another third repeated unit RU3, yet another fourth repeated unit RU4, yet another second repeated unit RU2, yet another first repeated unit RU1 and yet another third repeated unit RU3 are sequentially arranged in the second row L2 adjacent to the first row L1.

The slits S of the adjacent repeated units RU are connected to each other. The straight line slits S1 of the adjacent repeated units RU in the first row L1 are connected to each other, and the bent line slits S2 of the adjacent repeated units RU are connected to each other. The straight line slits S1 of the adjacent repeated units RU in the second row L2 are connected to each other, and the bent line slits S2 of the adjacent repeated units RU are connected to each other. The bent line slits S2 in the first row L1 and the straight line slits S1 in the second row L2 are connected to each other.

The slit S of the first repeated unit RU1 and the slit S of the second repeated unit RU2 are mirror-symmetrical with the first direction X1 (for example, the vertical direction) as the symmetry axis. The straight line slit S1 of the first repeated unit RU1 and the straight line slit S1 of the second repeated unit RU2 are mirror-symmetrical with the first direction X1 as the symmetry axis. The bent line slit S2 of the first repeated unit RU1 and the bent line slit S2 of the second repeated unit RU2 are mirror-symmetrical with the first direction X1 as the symmetry axis.

The straight line slit S1 of the first repeated unit RU1 and the straight line slit S1 of the third repeated unit RU3 are mirror-symmetrical with the first direction X1 as the symmetry axis. The bent line slit S2 of the first repeated unit RU1 and the bent line slit S2 of the third repeated unit RU3 are mirror-symmetrical with the second direction X2 as the symmetry axis. The first direction X1 is orthogonal to the second direction X2.

The slit S of the third repeated unit RU3 and the slit S of the fourth repeated unit RU4 are mirror-symmetrical with the first direction X1 as the symmetry axis. The straight line slit S1 of the third repeated unit RU3 and the straight line slit S1 of the fourth repeated unit RU4 are mirror-symmetrical with the first direction X1 as the symmetry axis. The bent line slit S2 of the third repeated unit RU3 and the bent line slit S2 of the fourth repeated unit RU4 are mirror-symmetrical with the first direction X1 as the symmetry axis.

In this embodiment, the connection structures CS are located in the slits S of the first repeated unit RU1, the second repeated unit RU2, the third repeated unit RU3, and the fourth repeated unit RU4 of the touch electrode area TR, and thus the adjacent repeated units RU in the touch electrode area TR are electrically connected.

There is no connection structure CS in the slits S of the first repeated unit RU1, the second repeated unit RU2, the third repeated unit RU3, and the fourth repeated unit RU4 of the dummy electrode area DR. Therefore, the dummy electrode DE in the dummy electrode area DR includes a plurality of island-like structures separated by the slits S.

In this embodiment, since the dummy electrode area DR and the touch electrode area TR of the electrode layer 200 have similar slit arrangements, the difference only lies in that the touch electrode area TR has the connection structure CS, and therefore, the difference between the maximum transmittance and the effective minimum transmittance on the electrode layer 200 may be less than 0.4% (for example, 0.2% to 0.4%, preferably less than 0.24%), thereby improving the ununiformed transmittance that affects display quality.

Figure 5:
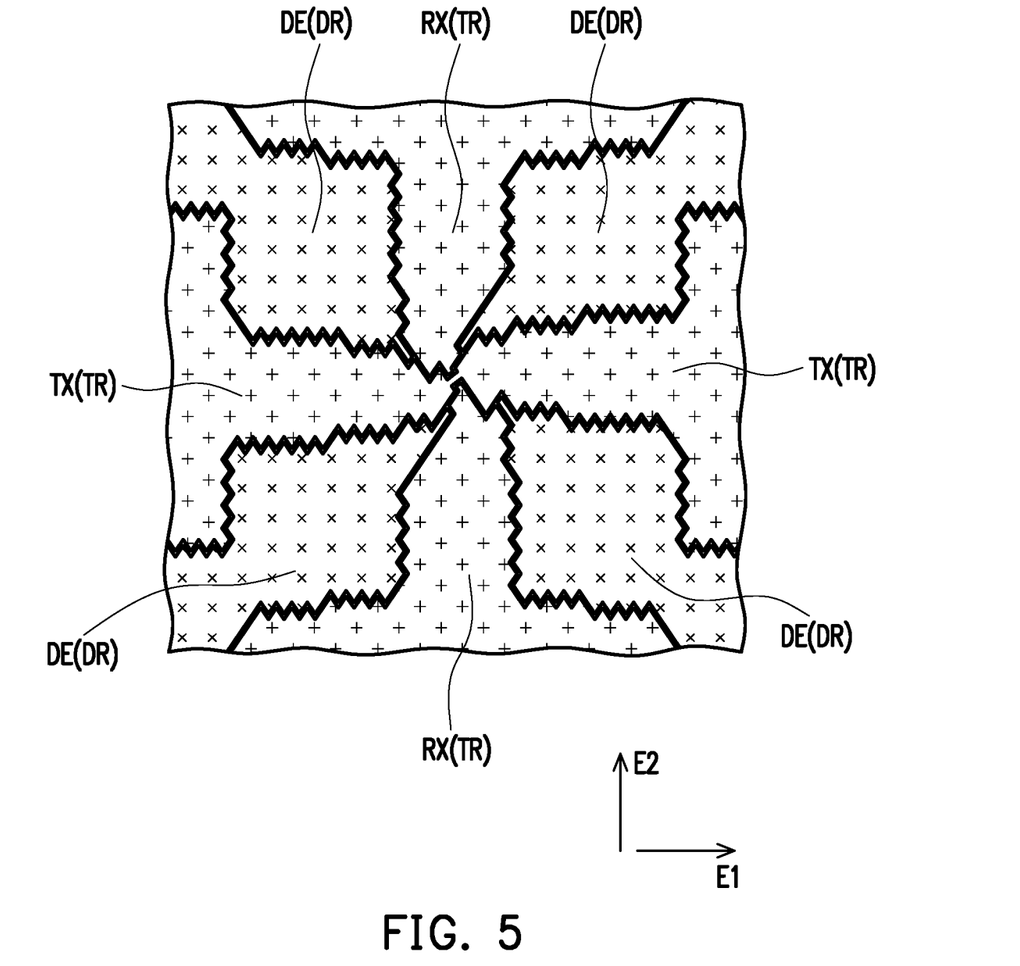
FIG. 5 is a schematic partially enlarged top view showing an electrode layer according to an embodiment of the present disclosure.

FIG. 5 is a schematic partially enlarged top view showing an electrode layer according to an embodiment of the present disclosure. It should be noted that the embodiment of FIG. 5 adopts the same reference numerals and parts of the embodiment of FIG. 2B, wherein the same or similar elements are denoted by the same or similar reference numerals, and the description of the same technical content is omitted. For the description of the omitted part, reference may be made to the foregoing embodiment, and details are not described herein.

FIG. 5 omits the slit on the dummy electrode area DR and the touch electrode area TR. Referring to FIG. 5, in the present embodiment, the driving electrode TX in the extending direction E1 is not disconnected. Alternatively, in other embodiments, the sensing electrode RX in the extension direction E2 is not disconnected.

Figure 6:
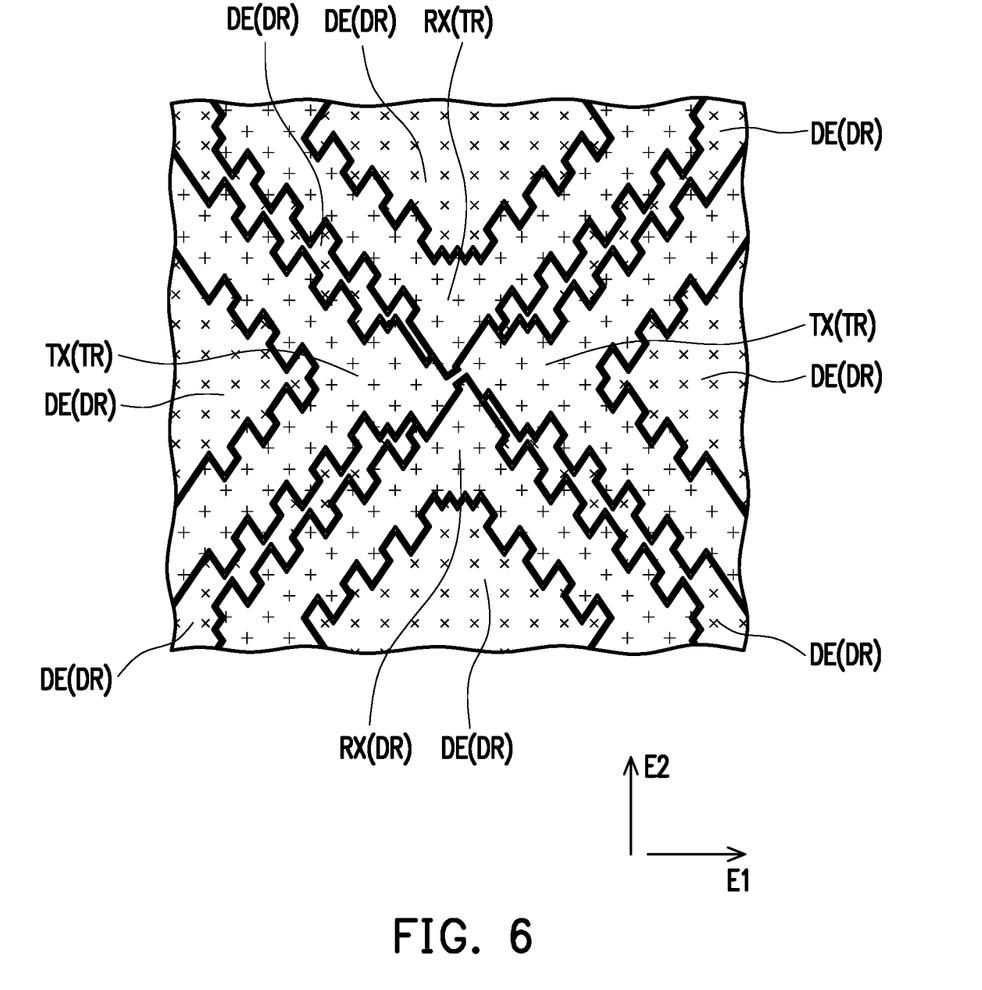
FIG. 6 is a schematic partially enlarged top view showing an electrode layer according to an embodiment of the present disclosure.

FIG. 6 is a schematic partially enlarged top view showing an electrode layer according to an embodiment of the present disclosure. It should be noted that the embodiment of FIG. 6 adopts the same reference numerals and parts of the embodiment of FIG. 5, wherein the same or similar elements are denoted by the same or similar reference numerals, and the description of the same technical content is omitted. For the description of the omitted part, reference may be made to the foregoing embodiment, and details are not described herein.

FIG. 6 omits the slit on the dummy electrode area DR and the touch electrode area TR. Referring to FIG. 6, in the embodiment, the electrode layer 200 includes four V-shaped structures adjacent to a position where the driving electrode TX and the sensing electrode RX are staggered with each other, and the V-shaped structure exhibits a zigzag shape at the edge.

Figure 7:
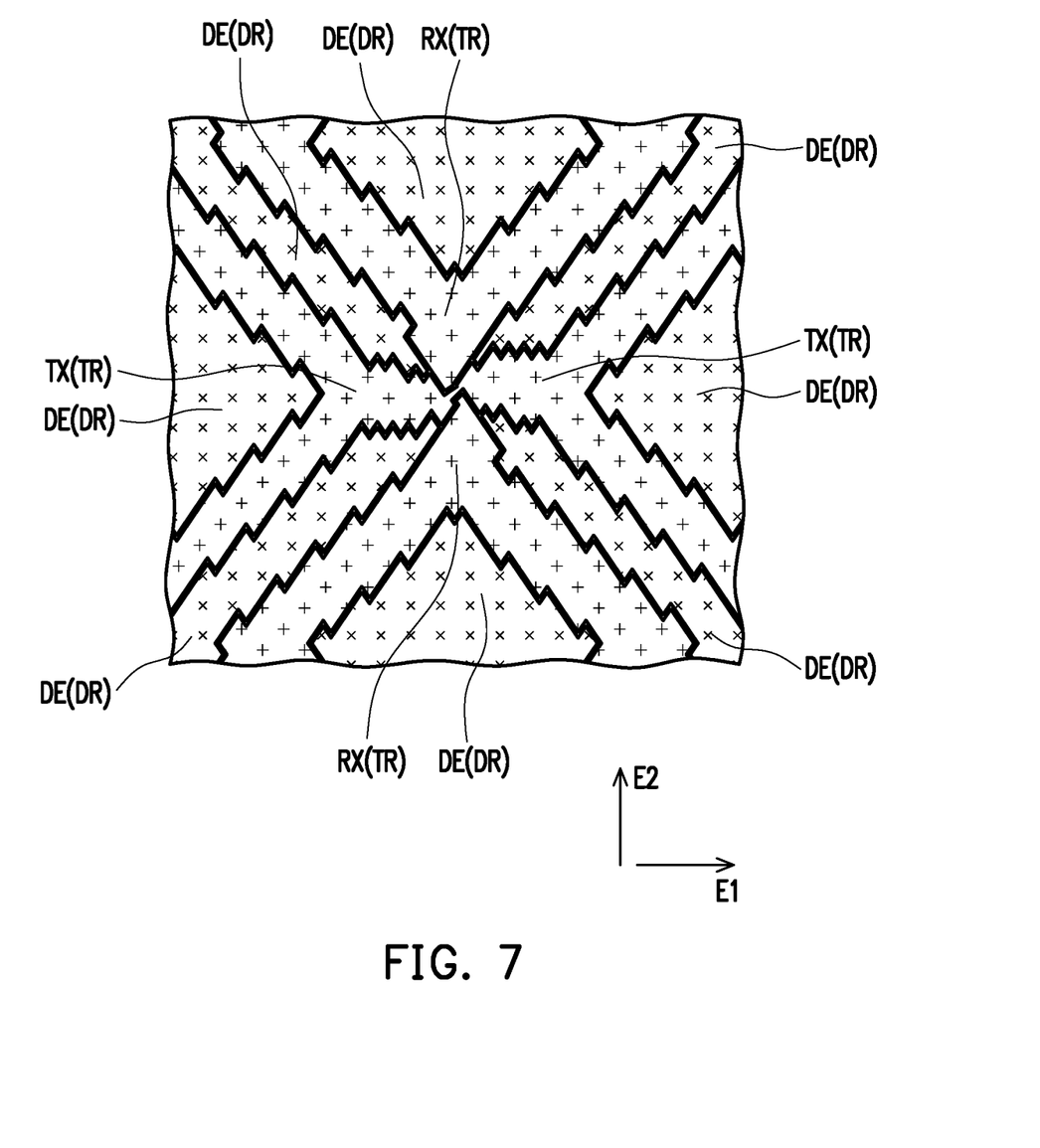
FIG. 7 is a schematic partially enlarged top view showing an electrode layer according to an embodiment of the present disclosure.

FIG. 7 is a schematic partially enlarged top view showing an electrode layer according to an embodiment of the present disclosure. It should be noted that the embodiment of FIG. 7 adopts the same reference numerals and parts of the embodiment of FIG. 6, wherein the same or similar elements are denoted by the same or similar reference numerals, and the description of the same technical content is omitted. For the description of the omitted part, reference may be made to the foregoing embodiment, and details are not described herein.

FIG. 7 omits the slit on the dummy electrode area DR and the touch electrode area TR. Referring to FIG. 7, in the embodiment, in the electrode layer 200 adjacent to a position where the driving electrode TX and the sensing electrode RX are staggered with each other, the driving electrode TX includes two Y-shaped structures, and the sensing electrode RX includes two V-shaped structures.

In summary, in the touch display device of the present disclosure, the dummy electrode area and the touch electrode area of the electrode layer have similar slit arrangements, and the difference is only that the touch electrode area has a connection structure, and therefore, the difference between the effective maximum transmittance and the effective minimum transmittance on the electrode layer can be small, thereby improving the problem of ununiformed transmittance that affects display quality.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch display device, comprising:
a display panel, comprising a plurality of sub-pixels; and
an electrode layer, disposed on the display panel and having a dummy electrode area and a touch electrode area, and the electrode layer comprising:
a plurality of repeated units, disposed in the dummy electrode area and the touch electrode area, each of the plurality of repeated units overlapping at least a corresponding one of the plurality of sub-pixels, wherein each of the plurality of repeated units comprises a plurality of slits, and the plurality of slits comprise a straight line slit and a bent line slit connected to the straight line slit; and
a plurality of connection structures, disposed in the plurality of slits of the plurality of repeated units disposed in the touch electrode area, and each of the plurality of repeated units disposed in the touch electrode area having at least one of the plurality of connection structures, wherein
each of the plurality of connection structures divides a corresponding one slit disposed in the touch electrode area into two segments wherein an area of each of the plurality of connection structures is less than an area of each of the plurality of slits.

2. The touch display device according to claim 1, wherein the touch electrode area of the electrode layer comprises a driving electrode and a sensing electrode, and an extending direction of the driving electrode is staggered with an extending direction of the sensing electrode, and the driving electrode is separated from the sensing electrode.

3. The touch display device according to claim 2, wherein the dummy electrode area of the electrode layer comprises a dummy electrode, and the dummy electrode is separated from the driving electrode and the sensing electrode.

4. The touch display device according to claim 3, wherein the dummy electrode comprises a plurality of island structures.

5. The touch display device according to claim 1, wherein each of the plurality of repeated units disposed in the touch electrode area has two of the plurality of connection structures, and the two of the plurality of connection structures are respectively disposed in the bent line slit and the straight line slit.

6. The touch display device according to claim 1, wherein the plurality of repeated units comprise three first repeated units, three second repeated units, three third repeated units, and three fourth repeated units,
wherein one of the three first repeated units, one of the three second repeated units, another one of the three first repeated units, one of the three third repeated units, one of the three fourth repeated units, and another one of the three second repeated units are sequentially arranged in a first row,
another one of the three fourth repeated units, another one of the three third repeated units, yet another one of the three fourth repeated units, yet another one of the three second repeated units, yet another one of the three first repeated units, and yet another one of the three third repeated units are sequentially arranged in a second row adjacent to the first row.

7. The touch display device according to claim 6, wherein the slits of the three first repeated units and the slits of the three second repeated units are minor-symmetrical with a first direction as a symmetry axis.

8. The touch display device according to claim 6, wherein the straight line slits of the three first repeated units and the straight line slits of the three third repeated units are minor-symmetrical with a first direction as a symmetry axis, and the bent line slits of the three first repeated units and the bent line slits of the three third repeated units are mirror-symmetrical with a second direction as a symmetry axis, the first direction is orthogonal to the second direction.

9. The touch display device according to claim 6, wherein the slits of the three third repeated units and the slits of the three fourth repeated units are minor-symmetrical with a first direction as a symmetry axis.

10. The touch display device according to claim 1, wherein the slits have a width ranging from 6 microns to 10 microns.

11. The touch display device according to claim 1, wherein the plurality of connection structures have a width ranging from 6 microns to 25 microns.

\* \* \* \* \*